US007684396B2

(12) United States Patent
Kim et al.

(10) Patent No.: US 7,684,396 B2
(45) Date of Patent: Mar. 23, 2010

(54) TRANSMISSION APPARATUS HAVING A PLURALITY OF NETWORK INTERFACES AND TRANSMISSION METHOD USING THE SAME

(75) Inventors: Jae Pyeong Kim, Daejeon (KR); Do Hyung Kim, Daejeon (KR); Jin Suk Ma, Daejeon (KR); Won Tae Kim, Daejeon (KR); Byung Chul Tak, Seongnam (KR); Hwan Gu Lee, Daejeon (KR); Sun Ja Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 538 days.

(21) Appl. No.: 11/635,575

(22) Filed: Dec. 8, 2006

(65) Prior Publication Data
US 2007/0133548 A1    Jun. 14, 2007

(30) Foreign Application Priority Data
Dec. 8, 2005   (KR) .............. 10-2005-0119301
Mar. 20, 2006   (KR) .............. 10-2006-0025211

(51) Int. Cl.
*H04L 12/28* (2006.01)
(52) U.S. Cl. .............. 370/389; 370/392; 370/419; 370/463; 709/228
(58) Field of Classification Search .............. 370/351, 370/389, 392, 419, 463; 709/228, 237
See application file for complete search history.

(56) References Cited

U.S. PATENT DOCUMENTS 5,948,069 A * 9/1999 Kitai et al. .............. 709/240
6,252,878 B1 * 6/2001 Locklear et al. .............. 370/401
7,065,367 B2 * 6/2006 Michaelis et al. ......... 455/452.2
7,151,781 B2 * 12/2006 MeLampy et al. .......... 370/468
7,403,477 B2 * 7/2008 Takeuchi et al. ............ 370/230
7,424,025 B2 * 9/2008 Qian et al. ................. 370/409
2003/0065816 A1 * 4/2003 Dharmadhikari et al. .... 709/240
2006/0187942 A1 * 8/2006 Mizutani et al. ............ 370/401
2006/0203758 A1 * 9/2006 Tee et al. .................... 370/315

FOREIGN PATENT DOCUMENTS

KR    2002-0067515        8/2002
KR    2002-0072918 A1     9/2002

* cited by examiner

*Primary Examiner*—Pankaj Kumar
*Assistant Examiner*—Duc T Duong
(74) *Attorney, Agent, or Firm*—Lowe Hauptman Ham & Berner, LLP

(57) ABSTRACT

A transmission apparatus having a plurality of network interfaces and a transmission method using a plurality of the network interfaces are provided. The transmission apparatus includes: a session information extraction unit which extracts session information of an IP packet; a network interface determination unit which determines a network interface associated with session information of the IP packet based on a table for mapping sessions to the network interfaces according to available bandwidths of the network interfaces; and a traffic distribution unit which transmits the IP packet to the determined network interface. Accordingly, traffic is distributed over a plurality of network interfaces, so that optimal communication performance can be ensured in a simultaneous multiple-mode connection environment, and network resources can be efficiently utilized.

12 Claims, 3 Drawing Sheets

TRANSMISSION APPARATUS HAVING A PLURALITY OF NETWORK INTERFACES AND TRANSMISSION METHOD USING THE SAME

CROSS-REFERENCE TO RELATED PATENT APPLICATION

This application claims the benefits of Korean Patent Application No. 10-2005-0119301 filed on Dec. 8, 2005, and Korean Patent Application NO. 10-2006-0025211 filed on Mar. 20, 2006, in the Korean Intellectual Property Office, the disclosures of which are incorporated herein in their entirety by reference.

BACKGROUND OF THE INVENTION

1. Field of the Invention

The present invention relates to a transmission apparatus having a plurality of network interfaces and a transmission method using a plurality of the network interfaces, and more particularly, to a transmission apparatus such as a terminal having a plurality of network interfaces capable of efficiently utilizing network resources by distributing network traffic over a plurality of the network interfaces and a transmission method using a plurality of the network interfaces.

2. Description of the Related Art

Recently, communication terminals such as mobile phones, PDAs, and notebook computers having various network interfaces for connection to a plurality of networks and for reception of various services instead of a single communication network have been provided. For example, a mobile phone which supports CDMA and WLAN and a PDA which supports CDMA and WiBro are provided. In a notebook computer, a WLAN network interface is basically provided, and a card for connection to other networks such as a PCMCIA interface card may be additionally provided.

In the fourth-generation network technology, various networks are provided simultaneously. For example, various wireless networks such as CDMA, WLAN, WCDMA, HSDPA, and WiBro networks are provided simultaneously, and a user can connect to desired networks through a suitable communication terminal having wireless cards.

Such wireless networks have a slower communication rate than that of a cable high speed communication network, and a data transmission rate may be lowered according to a wireless connection environment.

In such an environment, a user having a communication terminal capable of connecting a plurality of wireless networks can distribute traffic over a plurality of the wireless network through simultaneous connection to a plurality of the wireless networks simultaneously. In this case, in comparison with connection to a single network, the user can utilize wide bandwidth, and stable communication performance can be maintained even in an unstable wireless connection environment.

In addition, traffic can be distributed according to characteristics of services. Therefore, high quality services can be maintained. For example, in a terminal which supports HSDPA and WLAN, a user can receive a high-quality moving picture streaming service through the HSDPA and a file downloading service through the WLAN simultaneously. In this case, the bandwidth for the moving picture streaming service through the HSDPA can be maintained in the existing bandwidth. However, in a terminal which can connect only one wireless network, a limited bandwidth is divided for the two types of services. Therefore, the quality of the moving picture streaming service may be lowered, or the download rate of the file downloading service be lowered.

As a result, preferably, a terminal connects a plurality of the networks simultaneously, and traffic is distributed according to types of services. In addition, a method of efficiently distributing the traffic is required. In addition, in order to provide such services, a multiple-mode terminal which can connect a plurality of the networks simultaneously through hardware or software network interfaces is required.

SUMMARY OF THE INVENTION

The present invention provides a transmission apparatus and method capable of efficiently utilizing network resources by distributing IP-based data traffic over a plurality of network interfaces.

According to an aspect of the present invention, there is provided a transmission apparatus having a plurality of network interfaces, comprising: a session information extraction unit which extracts session information of an IP packet; a network interface determination unit which determines a network interface associated with session information of the IP packet based on a table for mapping sessions to the network interfaces according to available bandwidths of the network interfaces; and a traffic distribution unit which transmits the IP packet to the determined network interface.

According to another aspect of the present invention, there is provided a method of transmitting a packet using a plurality network interfaces, comprising: extracting session information of an IP packet; determining a network interface associated with session information of the IP packet based on a table for mapping sessions to the network interfaces according to available bandwidths of the network interfaces; and transmitting the IP packet to the determined network interface.

BRIEF DESCRIPTION OF THE DRAWINGS

The above and other features and advantages of the present invention will become more apparent by describing in detail exemplary embodiments thereof with reference to the attached drawings in which:

FIG. 3 is a view showing an example of a mobile communication environment which a transmission apparatus and a transmission method according to an embodiment of the present invention may be applied to.

DETAILED DESCRIPTION OF THE INVENTION

Hereinafter, the present invention will be described in detail by explaining exemplary embodiments of the invention with reference to the attached drawings.

The present invention relates to a multiple-mode terminal which distributes traffic into a plurality of networks and a traffic distribution method. More specifically, the present invention relates to a multiple-mode terminal which is connected to a plurality of network interfaces simultaneously to transmit and receive packets to the network interfaces so as to efficiently utilize network resources and to greatly increase bandwidth and a traffic distribution method using the same. The traffic distribution function may be implemented in software, hardware, and module manners.

Figure 1:
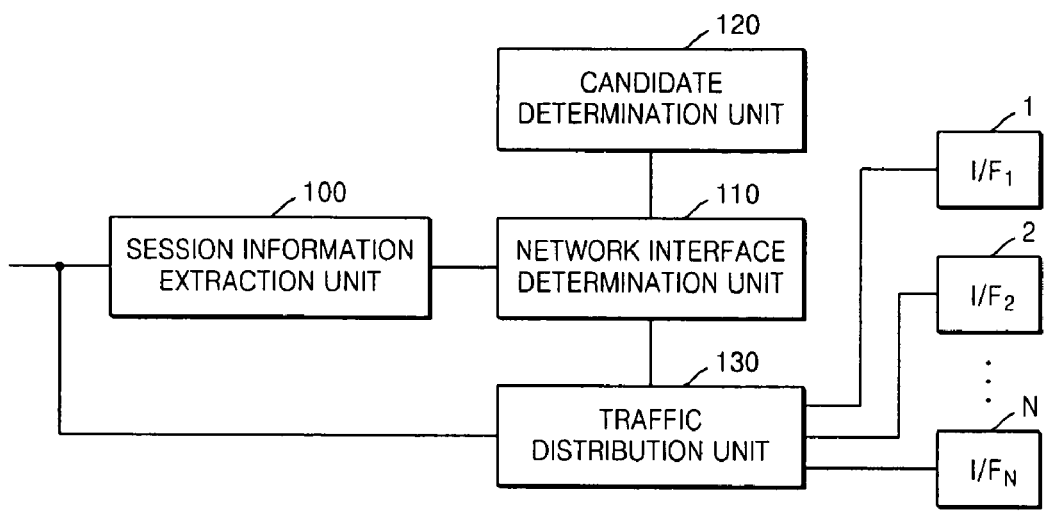
FIG. 1 is a block diagram showing a transmission apparatus having network interfaces according to an embodiment of the present invention.

FIG. 1 is a block diagram showing a transmission apparatus having a plurality of network interfaces according to an embodiment of the present invention. The transmission apparatus includes a session information extraction unit 100, network interface determination unit 110, a candidate determination unit 120, a traffic distribution unit 130, and a plurality of network interfaces 1, 2, . . . , N.

As an example of the transmission apparatus according to the embodiment of the present invention, there is a multiple-mode terminal. As an example of the network interface, there are a CDMA network interface, a WiBro network interface, a WLAN network interface, an HSDPA network interface, and an Ethernet network interface.

Referring to FIG. 1, the session information extraction unit 100 extracts session information of input IP packet and provides the extracted session information to the network interface determination unit. The session information includes at least one of destination IP address, destination port number, protocol type and has a function of specifying session of the IP packet.

The network interface determination unit 110 includes a table for mapping the sessions to the network interfaces and determines a network interface associated with the session information of the IP packet based on the table.

The traffic distribution unit 130 transmits the IP packet to the network interface determined among the N network interface 1, 2, . . . , N by the network interface determination unit 110.

When an IP packet corresponding to a new session is input, there is no information on a network interface mapped to the session in the table included in the network interface determination unit 110. In order to process the new session, the candidate determination unit 120 is further provided to the transmission apparatus. The candidate determination unit 120 determines an network interface having the largest available bandwidth as a candidate network interface and provides information on the determined candidate network interface to the network interface determination unit 110. The network interface determination unit 110 determines the candidate network interface as a network interface corresponding to the session of the IP packet. In addition, the network interface determination unit 110 adds the determined candidate network interface to the table by mapping the session of the IP packet to the candidate network interface.

Now, detailed operations of the candidate determination unit 130 are described. The candidate determination unit 130 measures available bandwidths of network interfaces periodically and determines the candidate network interface. As an example of a calculation method for the available bandwidth, there is a method of calculating the available bandwidth based on a difference between the largest bandwidth and the currently-used bandwidth of the network interface.

Figure 2:
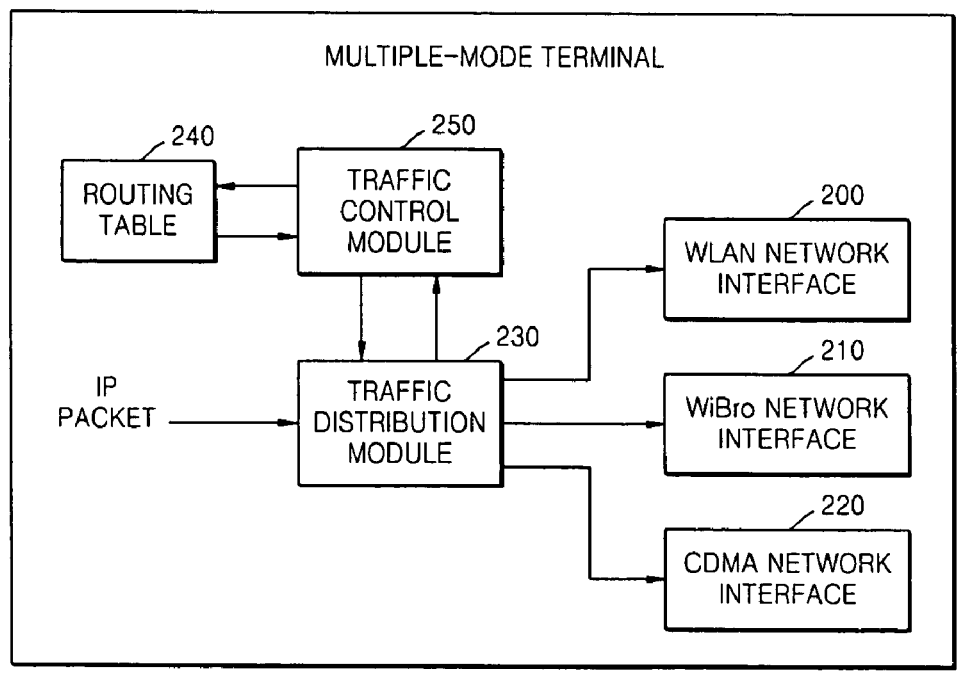
FIG. 2 is a view showing components associated with traffic distribution in a multiple-mode terminal according to another embodiment of the present invention.

FIG. 2 is a view showing components associated with traffic distribution in a multiple-mode terminal according to another embodiment of the present invention.

Referring to FIG. 2, the multiple-mode terminal includes network interfaces 200, 210, and 220 which can be connected to various networks, a traffic distribution module 230, a routing table 240, and a traffic control module 250. In FIG. 2, as an example, a multiple-mode terminal including network interfaces which can be connected to WLAN, WiBro, and CDMA networks is shown. However, the present invention may be applied to any terminal including two or more network interfaces irrespective of types of networks. For example, the present invention may be applied to a notebook including WLAN network interfaces WLAN1 and WLAN2, a mobile terminal including CDMA and WiBro network interfaces, a mobile terminal including CDMA, WLAN, and HSDPA network interfaces, a PC including WLAN and Ethernet network interfaces.

The network interfaces 200, 210, and 220 enable the transmission apparatus to perform data communication with a plurality of communication networks simultaneously.

The traffic distribution module 230 extracts the session information from the IP packet received in an IP layer. The session information includes the destination IP address, the destination port number, and the protocol type. Communication application services performed by a user can be distinguished from each other by using the session information.

The routing table 240 records a pair of the session information and an index of the interface corresponding to the session by using the session information extracted by the traffic distribution module as a key value. Detailed examples are as follows.

$\{(111.111.111.111), 80, TCP\} \rightarrow$ WLAN $\{(222.222.222.222), 2000, UDP\}$ WiBro $\{(33.33.33.33), 5000, TCP\} \rightarrow$ CDMA As shown in the above correspondence, an IP packet having the destination IP address of 111.111.111.111, the destination port number of 80, and the protocol type of TCP is transmitted to the WLAN network interface 200. The sessions and network interfaces for all the IP packets are recorded in a similar manner.

The traffic control module 250 manages the routing table 240 and selects optimal network interface among the network interfaces based on the available bandwidth. Detailed operations are as follows. The traffic control module 250 receives the session information from the traffic distribution module 230. The traffic control module 250 looks up the routing table and returns the index of the interface corresponding to the session to the traffic distribution module 230. In addition, the traffic control module 250 measures available bandwidths of the network interfaces 200, 210, and 220 periodically and determines the network interface having the largest capability as a candidate network interface corresponding to a new network interface. The determination of the candidate network interface is performed through the following calculation. Firstly, currently-available bandwidths of the network interfaces are calculated using Equation 1, and the index of the network having the largest available bandwidth is determined as the index of the candidate network interface.

$$(\text{Currently-Available Bandwidth}) = (\text{Largest Available Bandwidth}) - (\text{Currently-Used Bandwidth}) \quad [\text{Equation 1}]$$

If a session input from the traffic distribution module 230 does not exist in the routing table 240, the traffic control module 250 transmits the index of the candidate network interface to the traffic distribution module 230 so as to perform packet distribution and adds the new session and the index of the candidate network interface to the routing table 240. In this manner, when the same session is input, the index of the existing network interface can be looked up in the routing table 240, so that the packets included in the one session can be transmitted to the same interface.

In addition, the packet in the new session can be transmitted to the interface having the largest bandwidth, so that it is possible to efficiently utilize the network resources. For example, while a web service for the destination address (111.111.111.111) using the TCP 80 port is received through the WLAN, a UDP streaming service for the destination address (222.222.222.222) is performed through the WiBro network. As a result, without influence to a web service speed, the UDP streaming service can be received.

Figure 3:
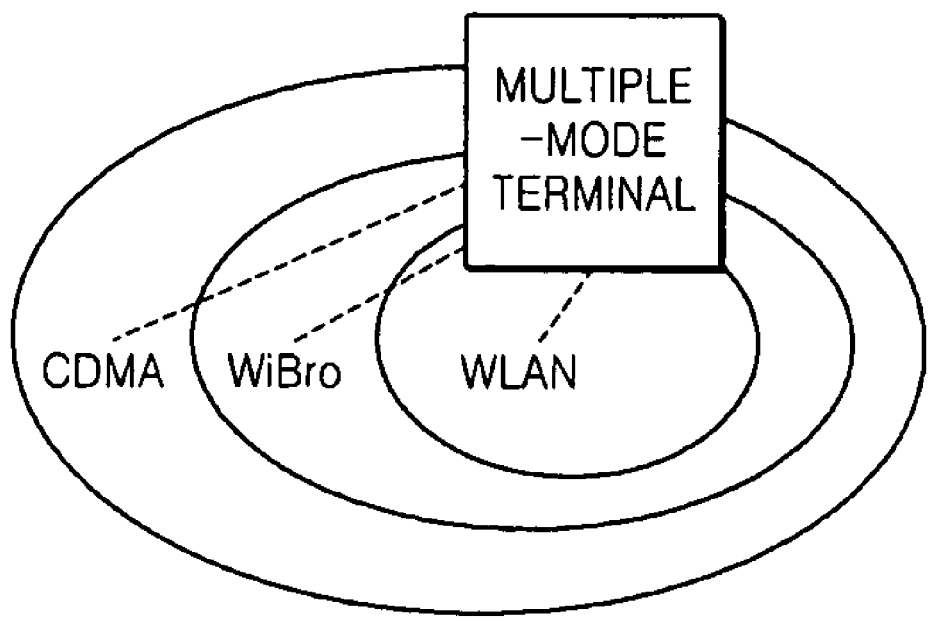

FIG. 3 is a view showing an example of a mobile communication environment which a transmission apparatus and a transmission method according to an embodiment of the present invention may be applied to. In the example of the mobile communication environment, a multiple-mode terminal which can perform a traffic distribution method can be simultaneously connected to various communication networks. As various wireless networks are developed, the multiple-mode terminal can be simultaneously connected to a plurality of the networks in a service-overlapped area.

Figure 4:
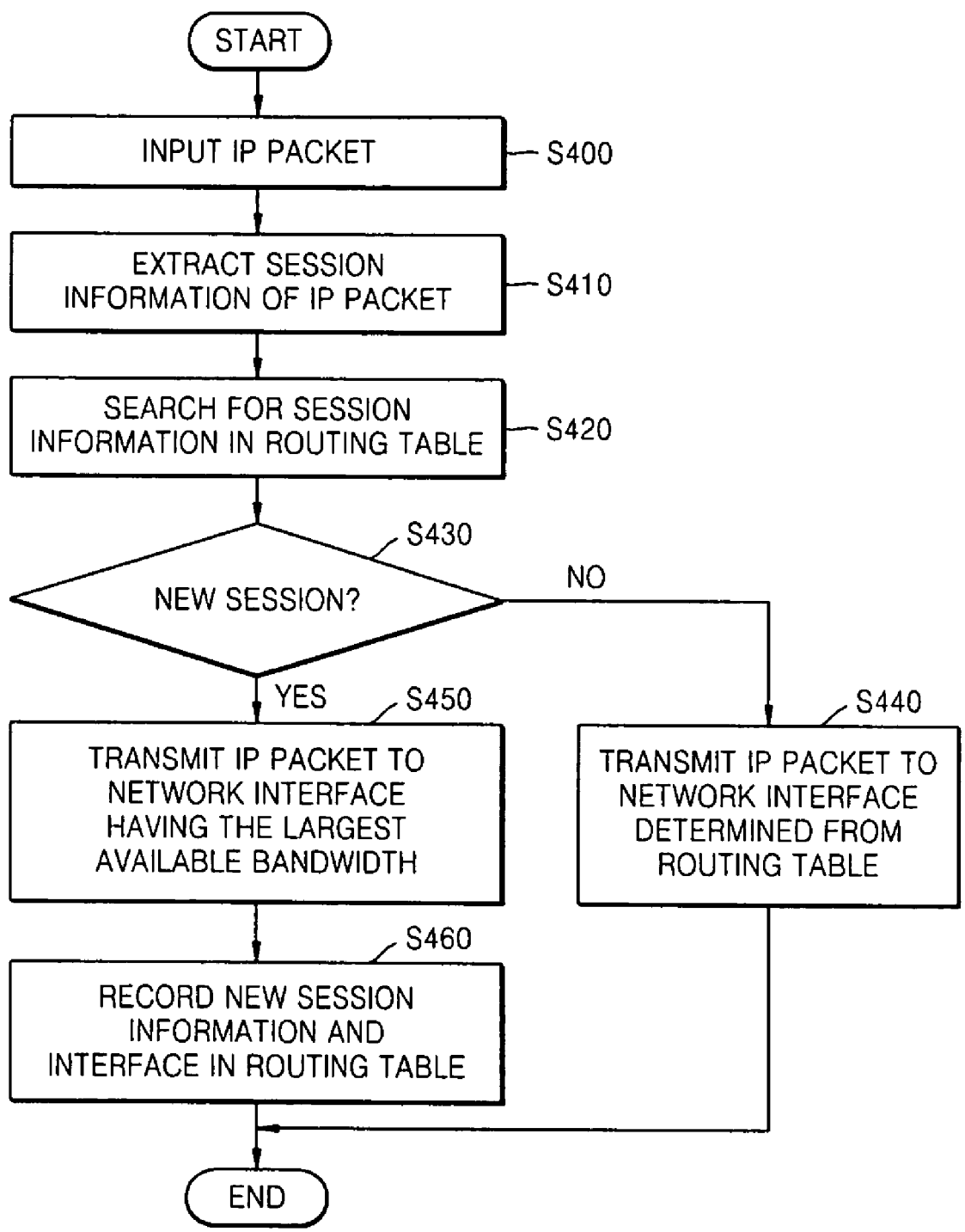
FIG. 4 is a flowchart showing a transmission method using network interfaces according to an embodiment of the present invention.

FIG. 4 is a flowchart showing a transmission method using network interfaces according to an embodiment of the present invention.

Referring to FIG. 4 and FIG. 2, when an IP packet is input to a traffic distribution module 230 (S400), the traffic distribution module 230 extracts the aforementioned session information from the IP packet (S410). In order to determine which network interface the IP packet is transmitted to, the traffic distribution module 230 transmits the session information to the traffic control module 250. The traffic control module 250 searches for the session information in the routing table 240 (S420). As a result of the searching, when there is a new session (S430), the traffic distribution module 230 is informed of the index of the network interface having the largest available bandwidth in order to efficiently distribute the packets (S450). The traffic control module 250 inserts information on the session and the network interface into the routing table 240 (S460). The traffic control module 230 monitors traffic utilization rates of the network interfaces periodically and determines the network interface having the largest bandwidth.

When the session of the IP packet input to the traffic distribution module 230 exists in the routing table 240, the IP packet is included in the same session, the IP packet is transmitted to the previously-designated network interface (S440).

In the above embodiment of the present invention, the traffic distribution module 230 and the traffic control module 250 are described as separate components or functional blocks, but the functions thereof may be included in one traffic control module.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in form and details may be made therein without departing from the spirit and scope of the present invention as defined by the appended claims.

According to the present invention, in a communication terminal, traffic is distributed over a plurality of networks according to types of services, so that optimal communication performance can be ensured in a simultaneous multiple-mode connection environment, and network resources can be efficiently utilized. Namely, in a multiple-mode terminal, IP-based data traffic is distributed over a plurality of the network interfaces, so that the network resources can be efficiently utilized, and a widened bandwidth can be provided to a user.

What is claimed is:

1. A transmission apparatus, comprising:
    a plurality of network interfaces;
    a table for mapping sessions to the network interfaces according to available bandwidths of the network interfaces;
    a session information extraction unit for extracting session information of an IP packet;
    a network interface determination unit for determining, by using said table, a network interface associated with the session information of the IP packet based on the available bandwidths of the network interfaces; and
    a traffic distribution unit for transmitting the IP packet to the determined network interface.

2. The transmission apparatus of claim 1, further comprising
    a candidate determination unit for determining a network interface having the largest available bandwidth as a candidate network interface,
    wherein, when the session information of the IP packet does not exist in the table, the network interface determination unit determines the candidate network interface as the network interface associated with the session information of the IP packet.

3. The transmission apparatus of claim 2, wherein the network interface determination unit adds the determined candidate network interface to the table by mapping the session of the IP packet to the candidate network interface.

4. The transmission apparatus of claim 2, wherein
    the candidate determination unit measures the available bandwidths of the network interfaces periodically and determines the candidate network interface as the network interface having the largest available bandwidth, and
    each of the available bandwidths is calculated based on a difference between the largest available bandwidth and the currently-used bandwidth of each network interface.

5. The transmission apparatus of claim 1, wherein the session information includes at least one of destination IP address, destination port number, and protocol type.

6. The transmission apparatus of claim 1, wherein the network interfaces include a CDMA network interface, a WiBro network interface, a WLAN network interface, an HSDPA network interface, and an Ethernet network interface.

7. A method of transmitting an IP packet using a transmission apparatus that has a plurality network interfaces, said method comprising:
    extracting, by a session information extraction unit of the transmission apparatus, session information of the IP packet;
    determining, by a network interface determination unit of the transmission apparatus, a network interface associated with session information of the IP packet based on available bandwidths of the network interfaces, wherein said determining comprises a table that maps sessions to the network interfaces according to the available bandwidths of the network interfaces; and transmitting, by a traffic distribution unit of the transmission apparatus, the IP packet to the determined network interface.

8. The method of claim 7, further comprising
determining a network interface having the largest available bandwidth as a candidate network interface,
wherein said determining comprises determining the candidate network interface as the network interface associated with the session information of the IP packet when the session information of the IP packet does not exist in the table.

9. The method of claim 7, further comprising:
adding the determined candidate network interface to the table by mapping the session of the IP packet to the candidate network interface.

10. The method of claim 8, wherein said determining comprises
measuring the available bandwidths of the network interfaces periodically, and
determining the candidate network interface as the network interface having the largest available bandwidth, and
wherein each of the available bandwidths is calculated based on a difference between the largest available bandwidth and the currently-used bandwidth of each network interface.

11. The method of claim 7, wherein the session information includes at least one of destination IP address, destination port number, and protocol type.

12. The method of claim 7, wherein the network interfaces include a CDMA network interface, a WiBro network interface, a WLAN network interface, an HSDPA network interface, and an Ethernet network interface.

* * * * *